Patented Dec. 1, 1925.

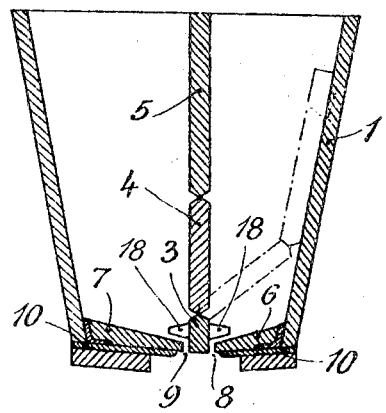
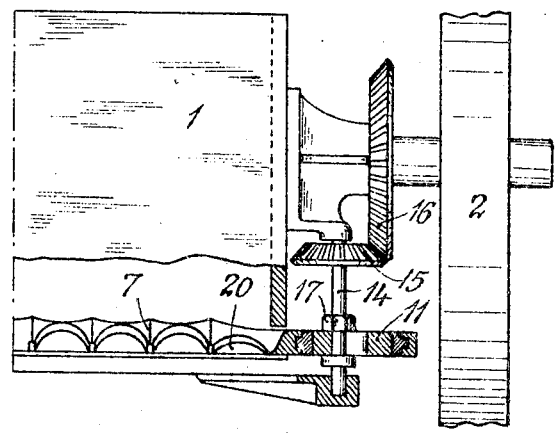
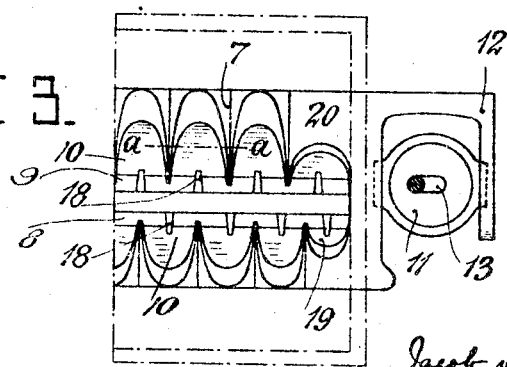

1,563,698

UNITED STATES PATENT OFFICE.

JACOB von STRATEN FINNE, OF AAS, NORWAY, ASSIGNOR TO A/S SONOAZ, OF CHRISTIANIA, NORWAY.

SPREADING APPARATUS FOR ARTIFICIAL MANURES.

Application filed October 30, 1924. Serial No. 746,820.

*To all whom it may concern:*

Be it known that I, JACOB VON STRATEN FINNE, a subject of the King of Norway, residing at Aas, in the Kingdom of Norway, have invented certain new and useful Improvements in Spreading Apparatus for Artificial Manures; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to spreading apparatus for artificial manures.

As well known, many mixtures of artificial manures are liable to get sticky and clotted when passing through the feed mechanism of a manure spreading apparatus, thereby obstructing the feed operation.

The object of my invention is to provide a feed mechanism for such apparatus, by aid of which this difficulty is avoided in that the reciprocating part of the feed device is provided with projections forming scoopshaped pockets between them, the walls enclosing said pockets decreasing in height towards the feeding slot.

In the following the invention is explained with reference to the accompanying drawings illustrating by way of example a preferred form of an apparatus arranged in accordance with the invention.

Fig. 1 is a cross section of the hopper serving as a receptacle for the manure and the feed device.

Fig. 2 is a side view of a part of the hopper and feed device, partly in section.

Fig. 3 is a plan view of one end of the feed device.

Fig. 4 is a cross section of the feeder fingers on line *a—a*, Fig. 2.

In the drawings 1 designates the hopper forming the receptacle for the manure, and 2 the wheels carrying the apparatus. This hopper 1 may as shown be provided with a partition made up of three parts 3, 4 and 5, hinged to one another. This partition normally divides the hopper into two separate chambers or compartments each provided with a separate feed device, but, as indicated in broken lines this partition may also be laid over against one side wall of the hopper, in such way that its upper part 5 is in contact with the said side wall, and its part 4 covers the feed device situated between the partition and the said side wall, whereby the apparatus is adapted for use as a single chamber apparatus.

The feed devices consist of a plurality of projections or fingers, 6 and 7 respectively, placed substantially transversely to the respective feeder slots 8 and 9. These projections or fingers are given a reciprocating movement on the bottom of the hopper, thereby feeding the manure out through the feed slots 8 and 9.

For the purpose of obtaining an efficient feed and simultaneously exposing the mass to the least possible amount of friction and pressure before it passes out through the slots 8 and 9 (such friction and pressure being liable to heat the mass and make it sticky and clotted) the fingers 8 and 9 are so shaped that the apertures or indentations between them form scoopshaped pockets having a base line of semi-elliptical or similar contour and with side walls and back walls sloping down towards this base line. The fingers decrease in height from the wall of the hopper 1 towards the feed slots, and preferably have a cross section similar to that shown in Fig. 4. The finger plates carrying the fingers 6 and 7 are adapted to slide to and fro on the underlying bottom plates 10, and are reciprocated by aid of eccentrics, cams or the like, each finger plate being driven by a separate eccentric or cam, mounted at either end of the hopper, or both actuating mechanisms may be mounted at the same end of the hopper. In the drawings only one of these actuating mechanisms is shown (Figs. 2 and 3) and consists of an eccentric disc 11, revolving in a frame fast to an arm 12, extending from the end of the finger plate. The eccentric disc is mounted on a shaft 14, journalled in the pockets fastened to the hopper, and is driven through the bevel gears 15, 16, from one of the carrying wheels 2. These actuating mechanisms may be coupled in and out at will by aid of a clutch coupling or the like (not shown in the drawings) connecting the gear 16 to the hub of the wheel 2. The stroke of the actuating mechanisms, and thereby the quantity of manure discharged from the feed mechanism may be controlled by adjusting the stroke of the eccentric disc 11, this disc being provided with a slot 13, along which the disc may be displaced relatively to the shaft 14, the disc being adapted to be clamped to this shaft in any position along the slot 13 by aid of a nut 17.

It will, however, be understood that the finger plates may also be reciprocated by means of other actuating mechanisms, as cranks with adjustable stroke, or the like.

The quantity of manure fed from the apparatus may also be controlled by adjusting the width of the feeder slots, the bottom plates 10 being adjustable transversely to the hopper.

For further adjustment of the quantities of manure discharged from the individual compartments or chambers of the hopper, when two or more such are used, the respective feed mechanisms may be adapted to discharge different quantities. As illustrated in Figs. 1 and 3, the finger plates and fingers are made of varying dimensions. Their stroke, too, may be made of different length.

In order to reduce the quantity of manure thrown sidewise to the apparatus the finger openings or pockets 19 and 20 to the extreme right and left of the finger plates may be dimensioned shallower than the openings or pockets between the other fingers.

For the purpose of scraping clean the points of the fingers and for crushing lumps and clods, which might otherwise choke up the fed slots, there are arranged stationary pins or scrapers 18, below which the tips of the fingers are passed during their reciprocation.

It will be understood that owing to the gently sloping sides of the fingers and finger plates their reciprocation will result in an uplifting and stirring movement in the lowest layers of the manure in the hopper, which is so gentle and slight, that the friction and heat resulting from their motion will be reduced to a minimum, and thereby the most prominent cause for the choking up of the feed slots in this kind of apparatus is eliminated.

Claims:

1. In feed devices for apparatus for spreading artificial manures, provided with reciprocating means for discharging the manure from a receptacle through a feed slot, the combination of feeder fingers forming between them scoopshaped pockets, having walls decreasing in height towards the feed slot, with means for reciprocating said fingers.

2. In feed devices for apparatus for spreading artificial manures, provided with reciprocating means for discharging the manure from a receptacle through a feed slot, the combination of feeder fingers forming between them scoopshaped pockets, having walls decreasing in height towards the fed slot, with means for reciprocating said fingers and stationary scrapers mounted above the path of the tips of said fingers.

3. In feed devices for apparatus for spreading artificial manure, provided with reciprocating means for discharging the manure from a receptacle through a feed slot, the combination of feeder fingers forming between them scoopshaped pockets having sloping walls decreasing in length towards the feed slots, the pockets nearest to the sides of the apparatus having less capacity than the rest of the pockets, with means for reciprocating said fingers.

4. In feed devices for spreading machines for artificial manures provided with reciprocating means for discharging said manure from separate compartments through separate feed slots the combination of fingers forming between them scoopshaped pockets having sloping walls decreasing in height towards said feed slots, said pockets being of different capacity for each feed slot, with means for reciprocating said fingers, and a hinged partition separating said compartments and shutting off one of the feed devices at will.

In testimony that I claim the foregoing as my invention, I have signed my name.

JACOB von STRATEN FINNE.